Aug. 8, 1944.    L. N. POND    2,355,597
GLASS ARTICLE HANDLING APPARATUS
Filed May 13, 1940    2 Sheets-Sheet 1
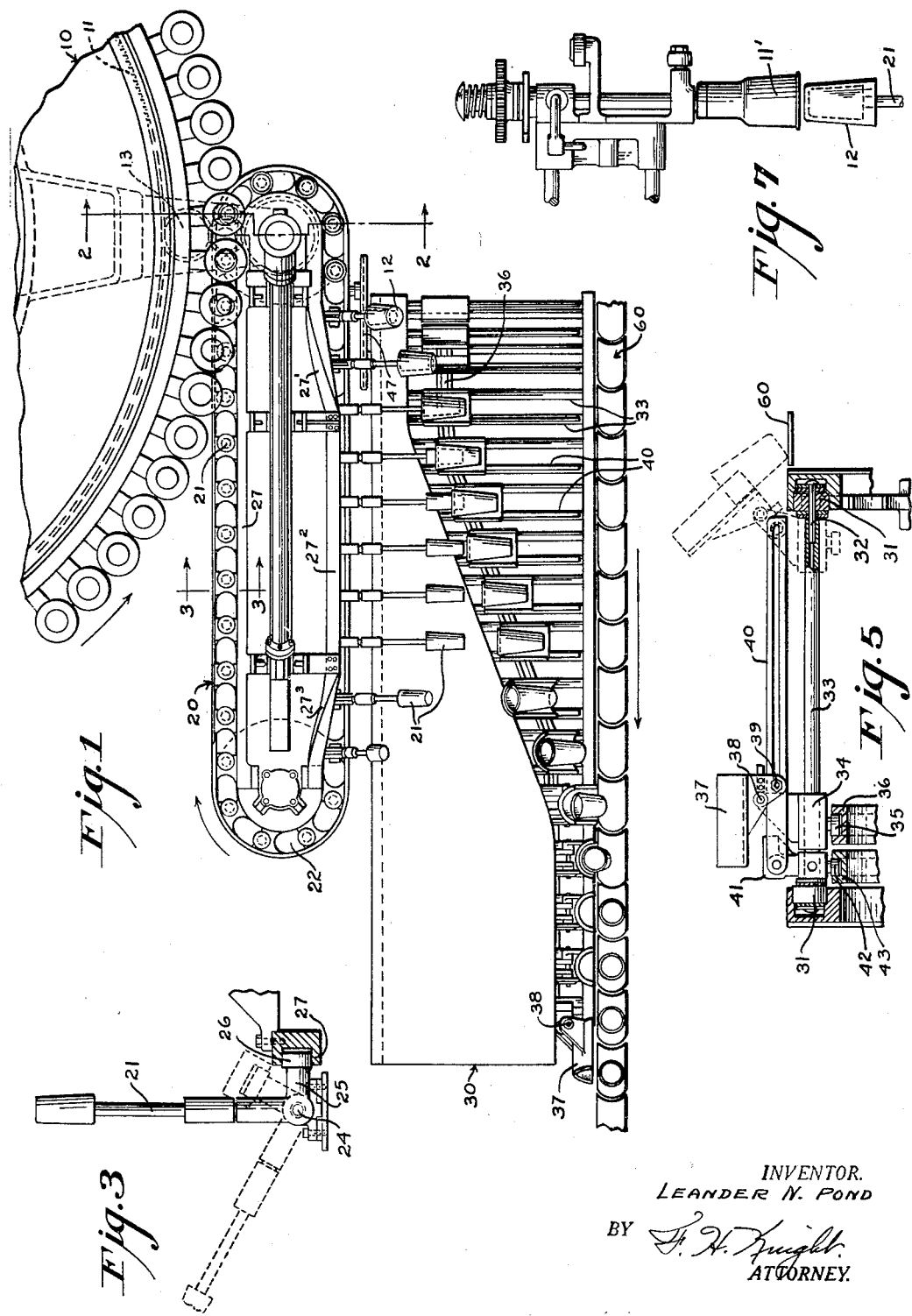
INVENTOR.
LEANDER N. POND
BY
ATTORNEY.

Aug. 8, 1944. L. N. POND 2,355,597
GLASS ARTICLE HANDLING APPARATUS
Filed May 18, 1940 2 Sheets-Sheet 2
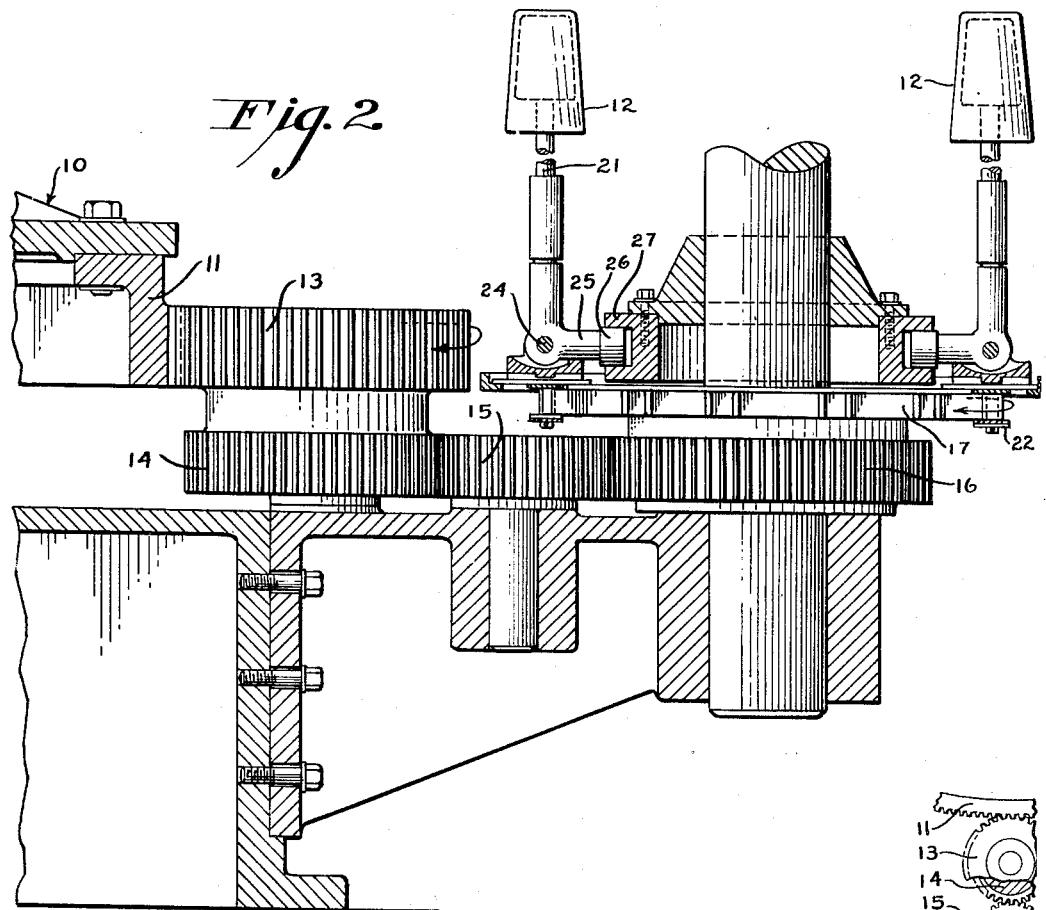
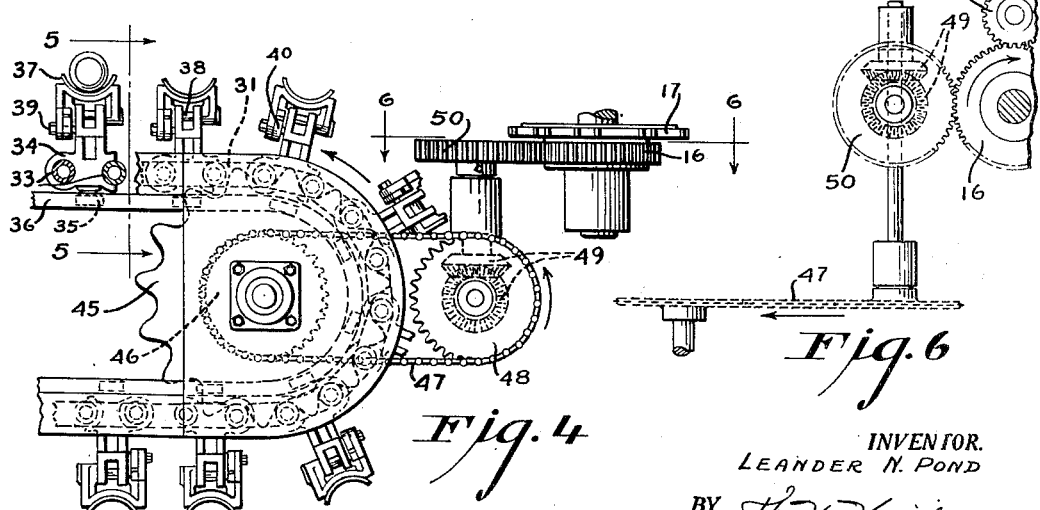
INVENTOR.
LEANDER N. POND
BY F. H. Knight
ATTORNEY.

Patented Aug. 8, 1944

2,355,597

UNITED STATES PATENT OFFICE 2,355,597

GLASS ARTICLE HANDLING APPARATUS

Leander N. Pond, Corning, N. Y., assignor to Corning Glass Works, Corning, N. Y., a corporation of New York Application May 18, 1940, Serial No. 336,021

7 Claims. (Cl. 198—27)

The present invention relates to methods of and apparatus for handling articles which may be in part in a plastic state as they are released from a glass working machine. It is conventional practice, for example, to place blown containers, bottom end up, in chucks of a turret machine and to burn the moile off the free ends of such containers as they travel about the axis of the turret from a loading station towards an unloading station. When employing such an apparatus, special care must be exercised in the removal and subsequent handling of the ware to prevent distortion of the parts which have been rendered plastic consequent to the burn-off operation.

The principal object of this invention is a satisfactory apparatus capable of handling ware of the foregoing defined character without detriment to the ware.

Another object is an improved method of handling glassware.

The present invention embodies a method wherein a tumbler in an erect but inverted position upon its release from a burn-off machine is caught on a support which enters the interior of the tumbler and over which the tumbler is brought to rest when its inner bottom surface encounters the support, thus avoiding contact with the rim of the tumbler still soft from the burn-off operation. The tumbler is then rotated through a 90° vertical arc and gently brought to rest in a horizontal position, moved clear of the support and rotated a further 90° to an upright position of rest.

Apparatus designed to handle ware in accordance with the method above outlined likewise forms part of this invention and one embodiment thereof is shown in the accompanying drawings wherein Fig. 1 is a plan view of apparatus embodying the invention in association with burn-off machine of a conventional form;

Fig. 2 is an enlarged fragmentary view taken on line 2—2 of Fig. 1;

Fig. 3 is a view taken on line 3—3 of Fig. 1;

Fig. 4 is a side elevational view of a fragment of the apparatus shown in Fig. 1;

Fig. 5 is a view taken on lines 5—5 of Fig. 4;

Fig. 6 is a view illustrating the drive between the burn-off machine and its associated conveyors; and Fig. 7 is a side elevational view of a ware holding assembly of the burn-off machine showing a tumbler support immediately below it supporting a tumbler just released from the burn-off machine.

In the embodiment of the invention illustrated the burn-off machine, generally designated 10, is provided with chucks, such as the chuck 11' (Fig. 7) in which tumblers are held in an inverted position and are released immediately after the moile has been removed and while their rims are still plastic from a burnoff operation. Just before a tumbler is released an associated tumbler conveyor 20 (Fig. 1) brings a tumbler receiving support 21 into the path of fall of a released tumbler, as illustrated in Fig. 7. This support with a number of others is carried by a chain 22 driven by the burnoff machine, as will be fully described hereinafter. Each such support is in the form of a bell-crank (Figs. 2 and 3) pivoted at 24 and with a short arm 25 carrying a roller 26 traveling in a channel-iron track 27. As will be observed from an inspection of Fig. 1, after a support has traveled from a tumbler receiving position and a slight distance around the right hand end of the stationary framework of the conveyor a warped portion 27' of track 27 forces the rotation of the support 21 about its pivot 24 for a sufficient distance to bring it and a supported tumbler 12 to a horizontal position.

As will be subsequently described, the tumbler while in a horizontal position is removed from its support 21 while the support continues to be held in its horizontal position by a portion 27² of track 27. After traveling the length of track portion 27² a track portion 27³ rotates the support back to the vertical position in readiness for the receipt of another tumbler or arrival under a chuck of the burnoff machine.

A tumbler conveyor 30, arranged in juxtaposed relation to conveyor 20 and also driven by the burnoff machine, as will be fully described hereinafter, includes a pair of similar chains 31 (Figs. 4 and 5) having links with extended pins 32 on which are supported pairs of rods 33 bridging the two chains. Each pair of rods supports a carriage 34 slidable on the rods and having a roller 35 traveling in a grooved cam track 36. Supported on each carriage 34 is a tumbler receiving trough 37. The positions of the conveyors 20 and 30 with respect to one another are such that a tumbler brought to a horizontal position by a support 21 of conveyor 20 comes to rest in a trough of the conveyor 30. Each trough 37 is pivoted on its carriage support at 38 and is also pivoted on a pin 39 passing through a slotted member 40 supported by a carriage 41 carried by rods 33 and having a roller 42 traveling in a grooved track 43. This latter track runs along a line parallel to the paths of travel of chains 31 and serves to permanently hold the members 40 and rods 33 against any sidewise movement so as to prevent side thrust on the drive chains 31. The shape of the track 36 is, on the other hand, such that it moves each carriage 34 in a lateral direction towards an ordinary straight-line conveyor 60 arranged alongside the conveyor 30. The lateral movement of a carriage is arranged to begin just after a support 21 has deposited a tumbler in the carriage supported trough and, accordingly, when a support 21 has brought a tumbler to rest in a trough the trough withdraws such tumbler from its support and carries it towards the conveyor 60. During the latter portion of lateral travel of carriage 34, pin 39 reaches the end of the slot in member 40 and subsequent travel of the carriage forces the trough 37 to rotate about its pivot pin 39, thereby causing it to discharge the tumbler right side up on the conveyor 60 which conducts the tumbler to a desired destination, for example, an annealing lehr.

The drive of the conveyors 20 and 30 is off a ring gear 11 carried by the burnoff machine (see Figs. 2 and 6). This gear is in mesh with teeth 13 of a cluster gear having teeth 14 in mesh with an idler gear 15. The idler gear is in mesh with a gear 16 having fixed thereto a sprocket wheel 17 for driving the tumbler support conveying chain 22 of conveyor 20.

The chains 31 of conveyor 30 are driven by sprocket wheels, such as the wheel 45 (Fig. 4) arranged on a cross shaft which also has fixed thereto a smaller sprocket wheel 46 driven by a chain 47 surrounding a driving sprocket wheel 48. The latter sprocket wheel is driven through the medium of bevel gears 49 driven by a spur gear 50 in mesh with gear 16. As will be evident, since both conveyors 20 and 30 receive their drive from gear 16, which is in turn driven, through gears 15, 14 and 13, by the gear 11 of the burnoff machine, cooperative and properly coordinated movement of the supports 21 and troughs 37 of the respective conveyors 20 and 30 for effecting the transfer of ware from the burnoff machine to the conveyor 60 is at all times maintained.

What is claimed is:

1. In combination, a plurality of article carriers comprising troughs for the receipt of articles in a horizontal position, supports adapted to receive articles thereover as they are ejected from an associated glass working machine, means for moving said supports to place such articles in a substantially horizontal position in said troughs, and means for shifting said troughs to remove the articles from said supports and for thereafter turning said troughs to deposit the articles in an upright position on an associated support.

2. In the handling of articles ejected in an inverted erect position from a glass working machine, devices adapted to receive thereover the inverted articles while they are still erect and inverted, carriers for receiving articles in a substantially horizontal position, means for turning said devices as required to deposit articles in a horizontal position on said carriers, and means for moving said carriers to dissociate the articles from said devices and for then tilting said carriers to deposit the articles in an erect and upright position on a support.

3. In a mechanism for transferring ware ejected in an erect position from a glass working machine to a reverse of such position on a support, a first carrier to receive thereover an article as it is ejected and to turn article through a 90° arc, a second carrier to receive the article after such turning movement is completed, and means for then moving the second carrier to dissociate the article from the first carrier and to turn the article a further 90° to deposit the article on the support in the reverse position to which it was received by the first carrier.

4. A mechanism for transferring ware ejected in an erect but inverted position from a glass working machine to an upright position on a support, a first carrier for the receipt thereover of an inverted article as it is ejected, a second carrier for the receipt of an article in the horizontal position, means for actuating said second carrier to dissociate an article from the first carrier and to turn such article and deposit it in an erect and upright position on the support, and means for operating said first carrier to deposit an article in a horizontal position on said second carrier.

5. In a device for disposing of glass articles released from a glass working machine, means including a plurality of bell cranks pivotally mounted thereon and each having one arm equipped with a support for the receipt of an article in a vertical position upon its release from the glass working machine, means cooperative with the other arm of each bell crank to turn it as required to bring the article to a substantially horizontal position, and means for removing the article from the support and for turning the article to effect its deposit in a vertical position on another support.

6. The combination with a machine wherein a hollow article of ware is held bottom end up and the article then released and allowed to fall by gravity, of a ware support, means for bringing said support into position to intercept the fall of the article by engagement in the inner bottom surface of the article with said support, a trough-like member arranged in a horizontal position, means for turning said support to bring an article arranged thereover to rest in a substantially horizontal position in said trough-like member, means for then laterally moving said member to clear the article from said support, and means for thereafter causing said laterally moving means to turn said member to the extent necessary to unload the article therefrom in an upright position.

7. The combination with a conveyor continuously moving about a closed path and equipped with article supports which successively release articles therefrom as the supports pass through a selected portion of their path of travel; of a second conveyor continuously moving about a closed path, equipped with article receiving supports, and whose path of travel successively brings its supports into position to receive articles released from the supports of the first conveyor; a third conveyor continuously moving about a closed path, equipped with article transfer supports and whose path of travel is such as to successively bring its supports into receiving relation with respect to supports of said second conveyor, means for moving the latter supports to bring articles carried thereby into association with the transfer supports, and means for actuating the latter supports to dissociate the articles from the second conveyor supports and for then actuating the transfer supports to effect the deposit of the articles in an upright position on a further support.

LEANDER N. POND.